United States Patent
Qiu

(10) Patent No.: US 10,189,372 B2
(45) Date of Patent: Jan. 29, 2019

(54) BOND PIN ASSEMBLY FOR CONNECTING CONNECTION CABLES

(71) Applicant: QIU, Youxue and QIU, Ni, Guangdong (CN)

(72) Inventor: Youxue Qiu, Guangdong (CN)

(73) Assignees: Youxue Qui, Shenzhen (CN); Ni Qiu, Shenzhen (CN)

( * ) Notice: Subject to any disclaimer, the term of this patent is extended or adjusted under 35 U.S.C. 154(b) by 139 days.

(21) Appl. No.: 15/372,514

(22) Filed: Dec. 8, 2016

(65) Prior Publication Data
US 2017/0158083 A1    Jun. 8, 2017

(30) Foreign Application Priority Data
Dec. 8, 2015 (CN) .................... 2015 2 1047479 U

(51) Int. Cl.
*B60M 5/00* (2006.01)
*B61L 13/00* (2006.01)

(52) U.S. Cl.
CPC ............ *B60M 5/00* (2013.01); *B61L 13/002* (2013.01)

(58) Field of Classification Search
CPC ................................ B60M 5/00; B61L 13/002
See application file for complete search history.

(56) References Cited

U.S. PATENT DOCUMENTS

| | | | | |
|---|---|---|---|---|
| 697,890 A | * | 4/1902 | Rowell | F16B 3/06 238/14.1 |
| RE12,359 E | * | 6/1905 | Richardson | 403/238 |
| 1,581,514 A | * | 4/1926 | Conrad | B60M 5/00 238/14.05 |
| 2,179,609 A | * | 11/1939 | Bidwell | H01T 13/34 174/152 S |
| 2,294,934 A | * | 9/1942 | Raasch | B60M 5/00 238/14.12 |
| 2,795,442 A | * | 6/1957 | Wilson | B60M 5/00 238/14.14 |
| 2,834,550 A | * | 5/1958 | Lowerre | B60M 5/00 238/14.9 |
| 3,844,601 A | * | 10/1974 | Rochester, Jr. | B66C 1/12 24/114.5 |

(Continued)

FOREIGN PATENT DOCUMENTS

CN    205064534 U    3/2016

*Primary Examiner* — Jason C Smith
(74) *Attorney, Agent, or Firm* — Renner, Otto, Boisselle & Sklar, LLP

(57) ABSTRACT

A bond pin assembly for connecting a connection cable with a rail, comprising: a bond pin that is inserted into a through hole in the rail, said bond pin having a transition portion and a screw portion, a diameter of one end of the transition portion being larger than a diameter of the other end of the transition portion, the end of the transition portion having a smaller diameter being connected with the screw portion; a conductive sleeve that is provided between the bond pin and a wall of the through hole of the rail, and a nut that is screwed on the screw portion to fasten an end of the connection cable between the nut and a side wall of the rail. By inserting the conductive sleeve with the shape corresponding to those of the through hole and the bond pin between the through hole and the bond pin and further taking fastening measure, the structural intensity of the bond bin assembly can be increased effectively.

8 Claims, 2 Drawing Sheets

(56) References Cited

U.S. PATENT DOCUMENTS 4,102,497 A * 7/1978 Lowerre .................. B60M 5/00
238/14.1
2017/0158083 A1* 6/2017 Qiu .......................... B60M 5/00

* cited by examiner

BOND PIN ASSEMBLY FOR CONNECTING CONNECTION CABLES

BACKGROUND OF THE INVENTION

1. Field of the Invention

The present invention relates to railway signal transmission, and particularly, to a bond pin assembly for connecting a connection cable with a rail.

2. Description of the Related Art

In a railway system of the related art, both railway signals and propulsion currents of electric circuits are transmitted through a rail. As shown in FIG. 1, a power supply 103, a connection cable 102, a rail 104, and a wheel 105 form a closed circuit when a wheel passes through a certain position of the rail 104. In this closed circuit, usually, the connection cable 102 is fixed to the rail 104 with a bond pin 101, which is a part of the closed circuit.

In the related art, the plug pin 101 usually includes a truncated-cone portion and a cylindrical portion. The truncated-cone portion is provided at the waist of the rail 104, that is, at a middle height of the rail 104, and is connected to a signal generator. Usually, the smaller end of the truncated-cone portion is inserted into a through hole of the rail 104 by hammering. The cylindrical portion is connected with one end of the connection cable 102 by soldering. The other end of the connection cable 102 is led to the inside of the power supply 103, and is connected with various elements by screws.

In the related art, there exist the following problems in fixing the connection cables.

1. The plug pin and the rail are connected by inserting the truncated-cone portion of the plug pin into the cylindrical through hole of the rail. However, when the truncated-cone portion is inserted into the cylindrical through hole, only parts of the truncated-cone portion is in contact with the wall of the cylindrical through hole, and there exist gaps in the through hole of the rail. When a train passes, the rail vibrates up and down strongly and highly frequently, and this may cause the plug pin loose, and as a result, the resistance of the closed circuit increases, and this causes signals abnormal.

2. When one hammers the end of the truncated-cone portion to insert the same into the through hole of the rail, if one hammers the plug pin too strongly, the plug pin may be damaged and this may cause cracks in the plug pin. The cracks may become bigger and bigger under strong vibration when a train passes, consequently, the damaged portion of the plug pin may peel off, and this is a big hidden danger for safety. In addition, the peeled-off portion of the plug pin lies in the gap between the rail and the plug pin, and may becomes rusty because of long term erosion of rain water, as a results, the rust may firmly adhere the plug pin to the rail inside the through hole, and this results in difficulty when disassembling and exchanging the plug pin.

In case the plug pin cannot be disassembled manually, one has to use dedicated pin puller to forcibly pull the plug pin out.

SUMMARY OF THE INVENTION

An object of the present invention is to provide a bond pin assembly for connecting a connection cable with a rail.

According to an aspect of the present invention, there is provided a bond pin assembly for connecting a connection cable with a rail, comprising: a bond pin that is inserted into a through hole in the rail, said bond pin having a transition portion and a screw portion, a diameter of one end of the transition portion being larger than a diameter of the other end of the transition portion, the end of the transition portion having a smaller diameter being connected with the screw portion; a conductive sleeve that is provided between the bond pin and a wall of the through hole of the rail, and a nut that is screwed on the screw portion to fasten an end of the connection cable between the nut and a side wall of the rail.

According to the present invention, the transition portion is firm fixed inside the through hole because of the conductive sleeve, and the connection cable is connected to the rail by screwing the nut on the screw portion.

Due to such a bond pin assembly, the bond pin is mounted by being inserted into the through hole in the rail and by screwing a nut, instead of hammering the bond pin. This avoids peeling off of the bond pin and difficulty in disassembling the bond pin caused by the rust in the related art. In addition, because the conductive sleeve fills the gap between the transition portion of the bond pin and the through hole of the rail, the bond pin and the through hole of the rail are firmly bond, and this avoids strong vibration of the bond pin caused by the train and further avoids loose of the bond pin. In addition, this avoids increase of the resistance and abnormal signal. Furthermore, the end of the connection cable is fixed by a screw instead of soldering, and this decreases work load of mounting.

Preferably, the bond pin assembly further includes a conductive gasket provided between the end of the connection cable and the nut.

Due to the conductive gasket, the connection cable is firmly compressed by the nut, and is in close contact with the wall of the rail.

Preferably, the bond pin assembly further includes a conductive retainer provided between the end of the connection cable and the conductive sleeve to compress the conductive sleeve.

Due to the conductive retainer, the conductive sleeve is in close contact with the truncated-cone portion of the bond pin, and this increases stability of contact.

Preferably, an inner surface of the conductive sleeve is an inclined surface, an outer surface of the conductive sleeve is in contact with the wall of the through hole, the inner surface of the conductive sleeve is in contact with an outer surface of the bond pin, and the conductive sleeve includes a flexible metal.

Due to the above structure, the conductive sleeve fits the transition portion well, and thus the bond pin is chucked closely. Because the conductive sleeve is made from flexible metal, this improves fitting between the truncated-cone portion of the bond pin and the conductive sleeve.

Preferably, the end of the transition portion having a larger diameter is out of the through hole of the rail.

Due to this, the transition portion is exposed out of the through hole of the rail in the connected state, therefore, the torque is distributed uniformly when wheels of a train pass through, and this structure also allows the bond pin to be disassembled easily.

Preferably, the bond pin assembly further includes a square head provided at the end of the transition portion having a larger diameter, and used for disassembly.

The technical advantages of the bond pin assembly according to the present invention are as below.

The bond pin is mounted by being inserted into the through hole in the rail and by screwing a nut, instead of hammering the bond pin. This avoids peeling off of the bond pin when hammering and avoids difficulty in disassembling the bond pin caused by the rust.

In addition, because the gap between the transition portion of the bond pin and the through hole of the rail is filled with the conductive sleeve having a shape fitting the shape of the transition portion of the bond pin and the shape of the through hole, the bond pin, the conductive sleeve, and the through hole of the rail are firmly bond, and this increases the strength of the three pieces bond together.

As a result, there is no gap between the transition portion of the bond pin and the through hole of the rail, and this avoids strong vibration of the bond pin, and poor electric connection.

Furthermore, the end of the connection cable is fixed by a screw instead of soldering, and this decreases work load of mounting.

BRIEF DESCRIPTION OF THE DRAWINGS

In the following, preferable embodiments of the present invention are described in detail in conjunction with the accompanying drawings.

DESCRIPTION OF THE PREFERRED EMBODIMENTS

Figure 1:
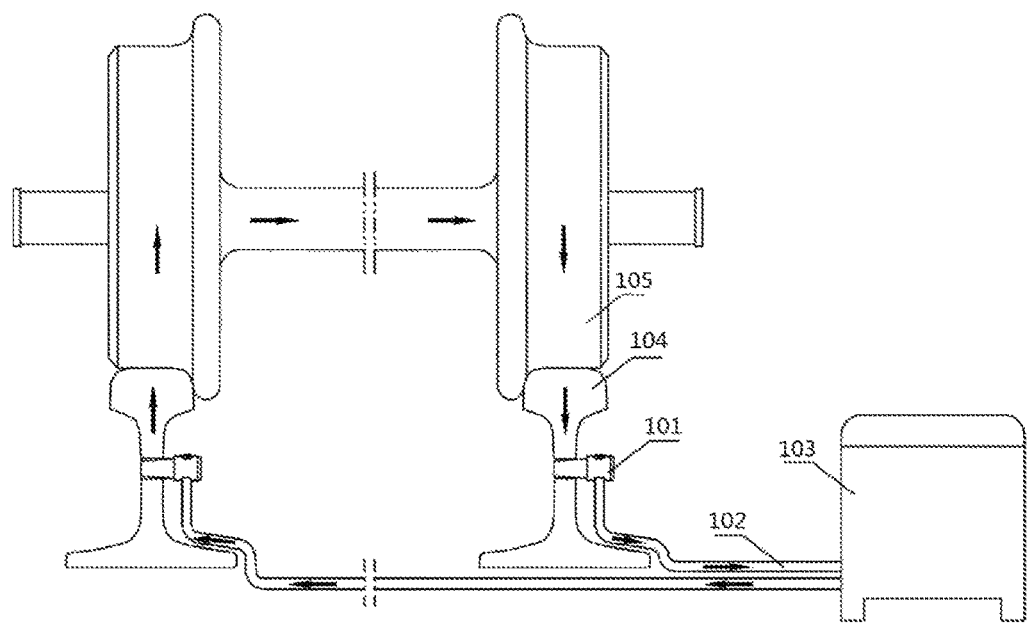
FIG. 1 is a schematic view of a bond pin assembly and a current circuit in the related art.

Specific embodiments of the present invention are described in conjunction with the accompanying drawings to further clarify the present invention.

For simplicity, only elements relevant to the present invention are showed in the drawings, and other elements are omitted; and only one of duplicate elements having the same structure or function is schematically shown in some of the drawings, and in the specification, the term "a" indicates one or more.

Figure 2:
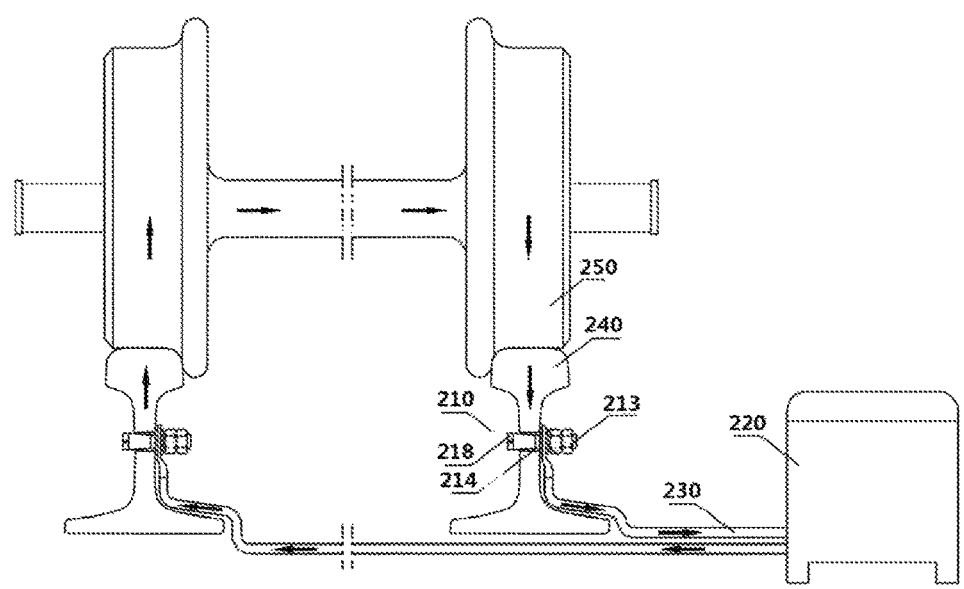
FIG. 2 is a schematic view of a bond pin and a current circuit according to the present invention.

FIG. 2 is a schematic view of a bond pin and a current circuit according to the present invention.

Figure 3:
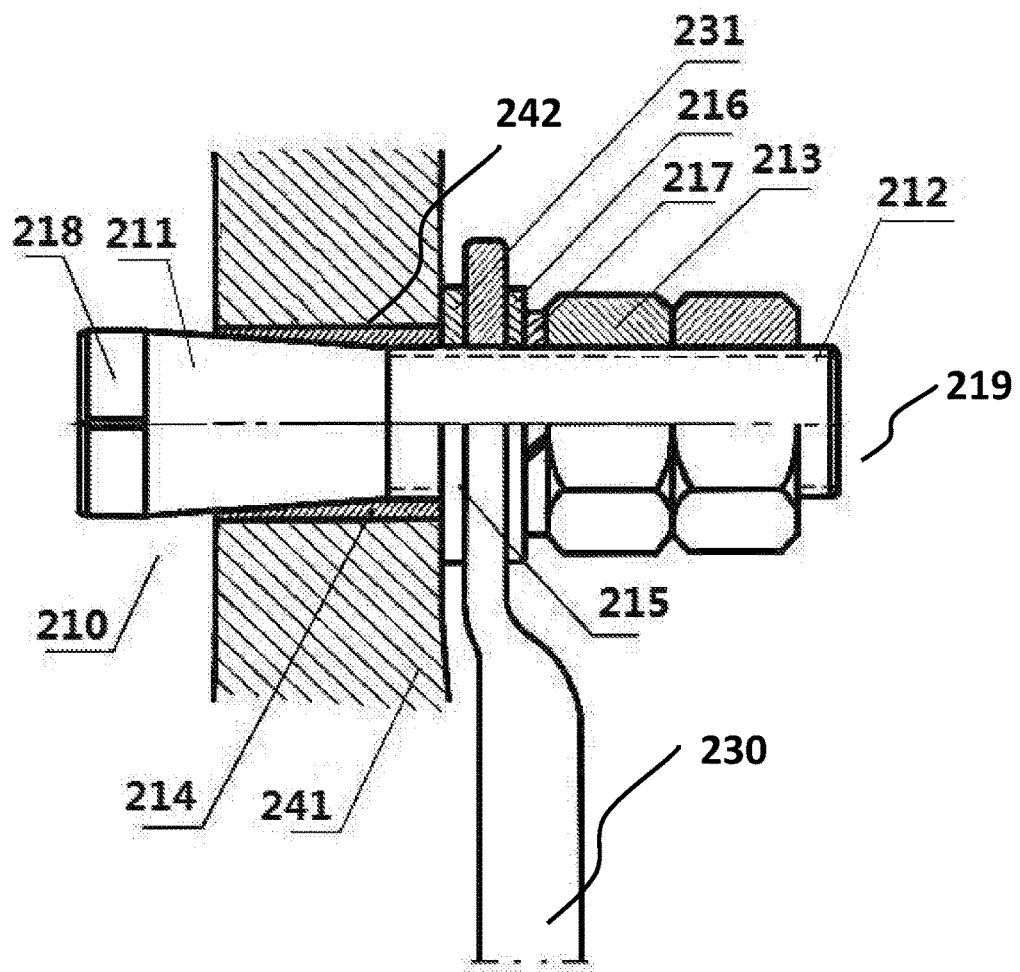
FIG. 3 is a schematic view of the structure of the bond pin assembly according to the present invention.

FIG. 3 is a schematic view of the structure of the bond pin assembly according to the present invention.

As shown in FIGS. 2 and 3, the present invention provides a bond pin assembly 210 for connecting connection cable 230.

The bond pin assembly 210 includes a bond pin 219 inserted into a through hole 242 in the rail 240 and a conductive sleeve 214 provided between the bond pin 219 and the wall of the through hole 242 of the rail 240.

The bond pin 219 has a transition portion 211 and a screw portion 212. As shown in FIG. 3, the diameter of one end of the transition portion 211 is larger than the diameter of the other end of the transition portion 211. The end of the transition portion 211 having a smaller diameter is connected with the screw portion 212.

As shown in FIG. 3, the conductive sleeve 214 is provided between the bond pin 219 and the wall of the through hole 242 of the rail 240 so as to fill the gaps therebetween.

The bound pin assembly 210 further includes a nut 213 screwed on the screw portion 212 to fasten the end 231 of the connection cable 230 between the nut 213 and the side wall of the rail 240.

When wheels 250 of a train (see FIG. 2) pass through, a power supply 220, the connection cable 230, the bond pin assembly 210, the rail 240, and the wheels 250 form a closed circuit, and the current, which flows in a direction as indicated by the arrow in FIG. 2, is stable because of the firm connection between the connection cable 230 and the rail 240.

Further, in the bound pin assembly 210 shown in FIG. 3, a conductive gasket 216 is provided between the end 231 of the connection cable 230 and the nut 212.

For example, the conductive gasket 216 is a stainless steel flat gasket.

Further, in the bound pin assembly 210 shown in FIG. 3, a conductive retainer 215 is provided between the end 230 of the connection cable 230 and the conductive sleeve 214 to compress the conductive sleeve 214.

For example, the conductive retainer 215 is a copper retainer.

In a preferable embodiment of the present invention, the inner surface of the conductive sleeve 214 is an inclined surface, and is in contact with the outer surface of the bond pin 219. Meanwhile, the outer surface of the conductive sleeve 214 is in contact with the wall of the through hole 242.

For example, the conductive sleeve 214 is made of flexible metal.

In addition, the end of the transition portion 211 having a larger diameter is out of the through hole 242 of the rail 240.

In addition, the bond pin assembly 210 has a square head 218 at the end of the transition portion 211 having a larger diameter, and is used for disassembling the bond pin 219.

With the bond pin assembly 210 according to the present invention, because the conductive sleeve 214 fills the gap between the transition portion 211 of the bond pin and the through hole 242 of the rail 240, the bond pin 219 and the through hole 242 of the rail are firmly bond, which avoids strong vibration of the bond pin 219 caused by the travelling train and in turn avoids loose of the bond pin 219. Further, this avoids increase of the resistance and abnormal signal. Furthermore, the end 231 of the connection cable 230 is fixed by a screw instead of soldering, which decreases work load of mounting.

The above embodiments are merely examples for illustration of the principles of the present invention, and the present invention is not limited to the embodiments. Those of ordinary skill in the art can make various changes and modifications, without departing from the spirit and substance of the invention. Such variations and modifications also fall in the scope of protection of the invention.

What is claimed is:

1. A bond pin assembly for connecting a connection cable with a rail, comprising:
    a bond pin that is inserted into a through hole in the rail, said bond pin having a transition portion and a screw portion, a diameter of one end of the transition portion being larger than a diameter of the other end of the transition portion, the end of the transition portion having a smaller diameter being connected with the screw portion;
    a conductive sleeve that is provided between the bond pin and a wall of the through hole of the rail,
    a nut that is screwed on the screw portion to fasten an end of the connection cable between the nut and a side wall of the rail, and
    a conductive gasket that is provided between the end of the connection cable and the nut.

2. The bond pin assembly according to claim 1, further comprising:
    a conductive retainer that is provided between the end of the connection cable and the conductive sleeve to compress the conductive sleeve.

3. The bond pin assembly according to claim 1, wherein,
an inner surface of the conductive sleeve is an inclined surface;
an outer surface of the conductive sleeve is in contact with the wall of the through hole,
the inner surface of the conductive sleeve is in contact with an outer surface of the bond pin, and
the conductive sleeve includes a flexible metal.

4. The bond pin assembly according to claim 1, wherein, the end of the transition portion having a larger diameter is out of the through hole of the rail.

5. The bond pin assembly according to claim 4, further comprising:
a square head that is provided at the end of the transition portion having a larger diameter, and is used for disassembly.

6. The bond pin assembly according to claim 1, wherein,
an inner surface of the conductive sleeve is an inclined surface;
an outer surface of the conductive sleeve is in contact with the wall of the through hole,
the inner surface of the conductive sleeve is in contact with an outer surface of the bond pin, and
the conductive sleeve includes a flexible metal.

7. A bond pin assembly for connecting a connection cable with a rail, comprising:
a bond pin that is inserted into a through hole in the rail, said bond pin having a transition portion and a screw portion, a diameter of one end of the transition portion being larger than a diameter of the other end of the transition portion, the end of the transition portion having a smaller diameter being connected with the screw portion;
a conductive sleeve that is provided between the bond pin and a wall of the through hole of the rail,
a nut that is screwed on the screw portion to fasten an end of the connection cable between the nut and a side wall of the rail, and
a conductive retainer that is provided between the end of the connection cable and the conductive sleeve to compress the conductive sleeve.

8. A bond pin assembly for connecting a connection cable with a rail, comprising:
a bond pin that is inserted into a through hole in the rail, said bond pin having a transition portion and a screw portion, a diameter of one end of the transition portion being larger than a diameter of the other end of the transition portion, the end of the transition portion having a smaller diameter being connected with the screw portion;
a conductive sleeve that is provided between the bond pin and a wall of the through hole of the rail,
a nut that is screwed on the screw portion to fasten an end of the connection cable between the nut and a side wall of the rail,
a conductive retainer that is provided between the end of the connection cable and the conductive sleeve to compress the conductive sleeve,
an inner surface of the conductive sleeve is an inclined surface;
an outer surface of the conductive sleeve is in contact with the wall of the through hole,
the inner surface of the conductive sleeve is in contact with an outer surface of the bond pin, and
the conductive sleeve includes a flexible metal.

* * * * *

UNITED STATES PATENT AND TRADEMARK OFFICE
CERTIFICATE OF CORRECTION

PATENT NO. : 10,189,372 B2
APPLICATION NO. : 15/372514
DATED : January 29, 2019
INVENTOR(S) : Youxue Qiu Page 1 of 1

It is certified that error appears in the above-identified patent and that said Letters Patent is hereby corrected as shown below:

On the Title Page

Item (73) Assignees should read:
"Youxue Qiu, Shenzhen (CN); Ni Qiu, Shenzhen (CN)"

Signed and Sealed this
Twenty-third Day of July, 2019

Andrei Iancu
*Director of the United States Patent and Trademark Office*